United States Patent [19]
Rybeck et al.

[11] Patent Number: 5,608,306
[45] Date of Patent: Mar. 4, 1997

[54] RECHARGEABLE BATTERY PACK WITH IDENTIFICATION CIRCUIT, REAL TIME CLOCK AND AUTHENTICATION CAPABILITY

[75] Inventors: Nils R. C. Rybeck, Cary, N.C.; Magnus Hansson, Malmö; Peter Holmqvist, Lund, both of Sweden

[73] Assignee: Ericsson Inc., Research Triangle Park, N.C.

[21] Appl. No.: 213,073

[22] Filed: Mar. 15, 1994

[51] Int. Cl.$^6$ .................................................. H01M 10/44
[52] U.S. Cl. .................... 320/15; 320/2; 429/61
[58] Field of Search ................... 320/15, 2, 30; 429/61

[56] References Cited

U.S. PATENT DOCUMENTS

| | | | |
|---|---|---|---|
| 4,289,836 | 9/1981 | Lemelson | 429/61 |
| 4,363,407 | 12/1982 | Buckler et al. | 209/3.3 |
| 4,455,523 | 6/1984 | Koenck . | |
| 4,553,081 | 11/1985 | Koenck | 320/43 |
| 4,593,409 | 6/1986 | Miller | 455/73 |
| 4,638,237 | 1/1987 | Fernandez . | |
| 4,680,527 | 7/1987 | Benenati et al. | 320/2 |
| 4,700,375 | 10/1987 | Reed | 379/61 |
| 4,716,354 | 12/1987 | Hacker | 320/39 |
| 4,743,831 | 5/1988 | Young | 320/48 |
| 4,888,702 | 12/1989 | Gerken et al. | 364/494 |
| 4,961,043 | 10/1990 | Koenck | 320/21 |
| 4,965,738 | 10/1990 | Bauer et al. | 364/482 |
| 4,977,393 | 12/1990 | Arnold et al. | 340/636 |
| 5,023,591 | 6/1991 | Edwards | 340/426 |
| 5,029,188 | 7/1991 | Lexa | 377/16 |
| 5,057,383 | 10/1991 | Sokira | 429/92 |
| 5,111,128 | 5/1992 | Branan, Jr. et al. | 320/2 |
| 5,136,620 | 8/1992 | Eaves | 377/15 |
| 5,150,031 | 9/1992 | James et al. . | |
| 5,184,059 | 2/1993 | Patino et al. | 320/15 |
| 5,200,686 | 4/1993 | Lee | 320/2 |
| 5,206,097 | 4/1993 | Burns et al. | 429/90 |
| 5,248,929 | 9/1993 | Burke | 320/48 |
| 5,349,535 | 9/1994 | Gupta | 364/483 |
| 5,350,993 | 9/1994 | Toya et al. | 320/2 |
| 5,399,446 | 3/1995 | Takahashi | 429/90 |

FOREIGN PATENT DOCUMENTS

| | | | |
|---|---|---|---|
| 0226360 | 6/1987 | European Pat. Off. . | |
| 0394074 | 10/1990 | European Pat. Off. . | |
| 3331360 | 3/1985 | Germany | 429/90 |
| 4096627 | 3/1992 | Japan . | |
| 6046533 | 2/1994 | Japan . | |
| 6-186310 | 7/1994 | Japan | G01R 31/36 |

Primary Examiner—Robert Nappi
Attorney, Agent, or Firm—Burns, Doane, Swecker & Mathis, L.L.P.

[57] ABSTRACT

An apparatus is provided for identifying an individual battery pack includes at least one resistor having a particular resistance value and a supervising unit for reading the particular resistance value of the at least one resistor to determine the individual identity of the battery. A clock is provided which is used to determine the remaining useful life of the battery. Recharging is selectively allowed or prevented, depending on the identify and the remaining useful life. Additionally, the authenticity of the battery pack can be verified by using a random number used as a variable in a mathematical formula stored in the application circuit and the battery and comparing the result of the calculation.

42 Claims, 5 Drawing Sheets

RECHARGEABLE BATTERY PACK WITH IDENTIFICATION CIRCUIT, REAL TIME CLOCK AND AUTHENTICATION CAPABILITY

BACKGROUND

The present invention is directed to a battery apparatus, and more particularly a battery apparatus having means for identifying individual batteries, a real-time clock, and means for authenticating batteries.

Rechargeable batteries have some great advantages when compared with regular, disposable batteries. For example, rechargeable batteries have a lower lifetime cost for most applications.

However, rechargeable batteries also have some disadvantages. For example, every time a rechargeable battery is used or recharged, a substantial transport of material takes place in the battery. In practice, it is impossible to design a battery so that the distribution of material involved will be unchanged over time, though such a design would be desirable. An increasing number of charging cycles will result in an uneven distribution of material inside the battery with a rising risk of malfunction, for example, an internal short-circuit of the battery, as a result thereof. It is of great importance to minimize the risk of malfunction of a battery, because every malfunction means a potential risk for people and material in vicinity of the battery.

Today, battery manufacturers try to minimize the risks by providing over-pressure vents, explosion-safe encapsulation, etc. One way to minimize the risk of malfunction is to allow only a limited number or charging cycles during the lifetime of a rechargeable battery. In other words, the life-time of the battery may be defined by a number of charging cycles or a maximum charging time. When using this type of battery, it would be of value if environmental factors as well, for example, heat, could be used for the calculation of the acceptable number of charging cycles.

U.S. Pat. No. 5,136,620 to Eaves discloses an electronic counting device for counting the charge cycles accumulated on a battery. However, the counting device consists of a display by which a counted value is output to the user. The user must know what the count means in terms of the battery life; there is no mechanism by which the application circuit or recharging device to which the battery is connected receives this information.

Other prior art combinations of batteries and charging circuits have had either a simple way to identify a battery as a member of a certain class or family (U.S. Pat. No. 5,184,059 to Patino et al. and U.S. Pat. No. 5,200,686 to Lee), or a complex arrangement inside the battery pack to secure that this battery pack individual will be treated the best way (U.S. Pat. No. 4,553,081 to Koenck, U.S. Pat. No. 5,057,083 to Sokira, U.S. Pat. No. 4,965,738 to Bauer et al., and U.S. Pat. No. 4,289,836 to Lemelson). However, these devices do not provide a signature for every battery pack which is easy to produce and easy to recognize with a high degree of probability, to make it possible for the charger and/or the battery-powered apparatus to recognize a single individual battery.

Another problem found in existing rechargeable batteries results from the marketing of batteries made by unauthorized manufacturers. In particular, manufacturers of portable equipment which is supplied with power by rechargeable batteries want to supply the market with their own batteries. This is a result of both commercial and technical considerations. If a customer buys a battery from an unauthorized manufacturer, there may be a safety risk because the batteries are not compatible with the original battery charger.

For example, U.S. Pat. No. 4,593,409 to Miller discloses a warning and protection circuit arrangement suitable for use in conjunction with a two-way portable transceiver having a removable battery pack/antenna which includes a battery enclosure containing an antenna structure. A circuit is enclosed inside the battery enclosure for providing information indicative of certain predetermined parameters of the antenna or the battery. This information may be used by the transceiver to provide the user with an alert in the event an inappropriate battery pack/antenna is being used. However, this requires the provision of a separate circuit thus increasing the size and cost of the battery pack.

A cellular telephone including a battery time monitor having a real time clock is disclosed in U.S. Pat. No. 5,248,929 to Burke. This patent discloses use of the battery time monitor which provides a user with a visual feedback as to the amount of time remaining for operation of the cellular telephone so that the user may determine how long the next call can last before the battery is discharged. However, this requires a separate circuit within the cellular telephone to monitor the battery. Additionally, because the clock is provided in the cellular telephone circuit, if the battery becomes totally discharged, the real time clock may lose its ability to keep time accurately.

SUMMARY

The present invention overcomes the disadvantages noted above.

The present invention relates to a battery pack which allows instant identification of the battery pack and the use of such identification for purposes for controlling the recharging of the battery. According to the present invention, every battery pack is provided with a signature which is easy to produce and easy to recognize with a high degree of probability to make it possible for the charger and/or the battery powered apparatus to recognize a single individual battery. A real time clock is also provided within the battery pack. Further, according to the present invention, a battery identification system is provided which allows easy identification of counterfeit battery packs.

According to one embodiment of the present invention, an apparatus is provided for identifying an individual battery pack, comprising at least one resistor having a particular resistance value, and a supervising unit for reading the particular resistance value of the at least one resistor to determine the individual identity of the battery pack.

According to one embodiment of the present invention, an apparatus is provided for controlling recharging of an individual battery pack comprising means for identifying a particular battery pack, and supervising means for selectively allowing and preventing recharging of the individual battery pack responsive to the means for identifying.

According to one embodiment of the present invention, an apparatus is provided for providing date and time information to an application circuit which uses a battery pack, the apparatus comprising a real-time clock provided in the battery pack, and means for providing real-time clock information from the real-time clock to the application circuit to which the battery pack is connected.

According to one embodiment of the present invention, an apparatus is provided for controlling an operational state of an application circuit, the apparatus comprising means for verifying the authenticity of a battery pack which has been connected to an application circuit, the means for verifying comprising means for storing a predetermined mathematical formula provided in the battery pack and in the application circuit, means for generating a random number, means for calculating a first result of the mathematical formula in the battery pack using the random number, means for calculating a second result of the mathematical formula in the application circuit using the random number, and means for comparing the first result to the second result and outputting a verification signal, the apparatus further comprising means for placing the application circuit in an non-operational state responsive to the means for verifying when the verification signal indicates that the first result does not equal the second result.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which.

DETAILED DESCRIPTION

Figure 1:
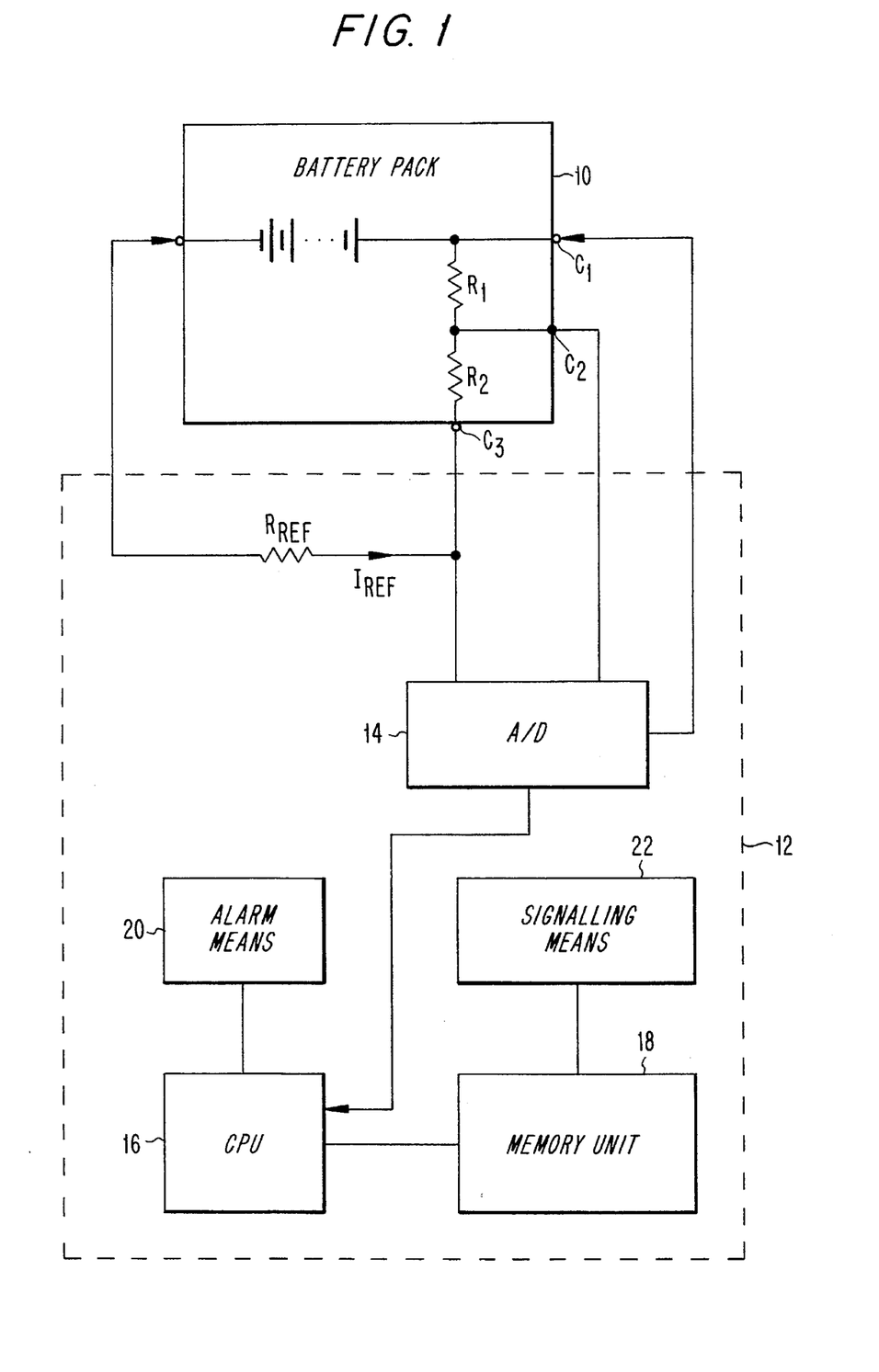
FIG. 1 illustrates an exemplary configuration for the battery pack according to a preferred embodiment of the present invention.

According to the present invention, only a limited number of charging cycles are permitted during the lifetime of a rechargeable battery. According to a preferred embodiment of the present invention, as shown in FIG. 1, the supervising unit is provided in the charging apparatus (for example, a separate charger, not shown) or in the battery-powered equipment (for example, a cellular mobile phone, pager, or video cam corder, not shown). The supervising unit has the ability to identify individual batteries. Upon recognizing a particular battery individual, the charging apparatus or battery powered equipment will only accept recharging for a limited number of cycles. The number of available cycles is based on tests made by the manufacturer or an independent laboratory. A safety factor may also be incorporated in the number for each battery type, which safety factor can be chosen from the test data. The setting of the available cycles for the different battery types is believed to be within the skill of the ordinary artisan in possession of the instant disclosure.

The exemplary implementation of such a supervising circuit 12 is shown in FIG. 1. In every battery pack 10, N resistors are installed, N having a minimum value of one. The resistors are provided in the range of zero to ∞ ohms.

As shown in FIG. 1, the resistors R1 and R2 are connected between connectors $C_1$, $C_2$ and $C_3$ that can be reached on the surface of the battery unit 10. One or more of the connectors may be connected to more than one resistor or to any other part of the battery, for example, the "+" pole. In this way, the value or values of the resistor or resistors can be used as a fingerprint of the battery to recognize a particular individual battery, and can be used as a key to permit recharging of the particular battery pack.

For example, by selecting two resistors in the E-12 series, 3,000 combinations having different resistance values are available. This would provide reasonable individuality to enable the charging circuit to identify individual batteries with little conflict.

In choosing the number of resistors N, a number of factors may be considered. These include what is practical and the needed probability that the owner of the battery powered apparatus does not get two or more batteries with each set of resistors. A preferred range for the value for each resistor is between 0 to 100 kΩ and an open circuit.

According to a preferred embodiment, supervising circuit 12 includes an analog to digital (A/D) converter 14 connected to the resistors and the terminal units or connectors $C_1$, $C_2$ and $C_3$ of the battery unit. The A/D converter 14 output provides the digital equivalent of the resistance value to the central processing unit (CPU) 16. The CPU 16 is connected to a memory unit 18 for storing the recharging information associated with the particular individuals. The memory unit 18 may be a non-volatile memory or a volatile memory which is supplied with power either by the battery pack or from a separate external power source. According to one embodiment, the memory unit 18 is a volatile memory which requires a relatively small amount of current such that the battery pack itself can supply power to the memory unit regardless of the charging condition of the battery pack.

Reference resistance value $R_{ref}$ and a reference current $I_{ref}$ are used to allow the supervising unit 12 to read the values of $R_1$ and $R_2$ to identify the battery individual. In particular, a current $I_{ref}$ is run through $R_{ref}$, $R_1$, and $R_2$ and the voltage potential across the resistors is measured by the A/D converter 14. The potential generated by $R_{ref}$ is entered into the A/D converter 14 for the purpose of allowing the supervising unit 12 to read the values of $R_1$ and $R_2$ regardless of the degree of energization of the battery.

An alarm means 20 is connected to the CPU 16 to allow the user to be informed that the battery pack has reached the end of its useful life. The alarm means 20 may consist of an audio alarm, a display, an LED, a vibrating alarm, or any other suitable device.

Figure 2:
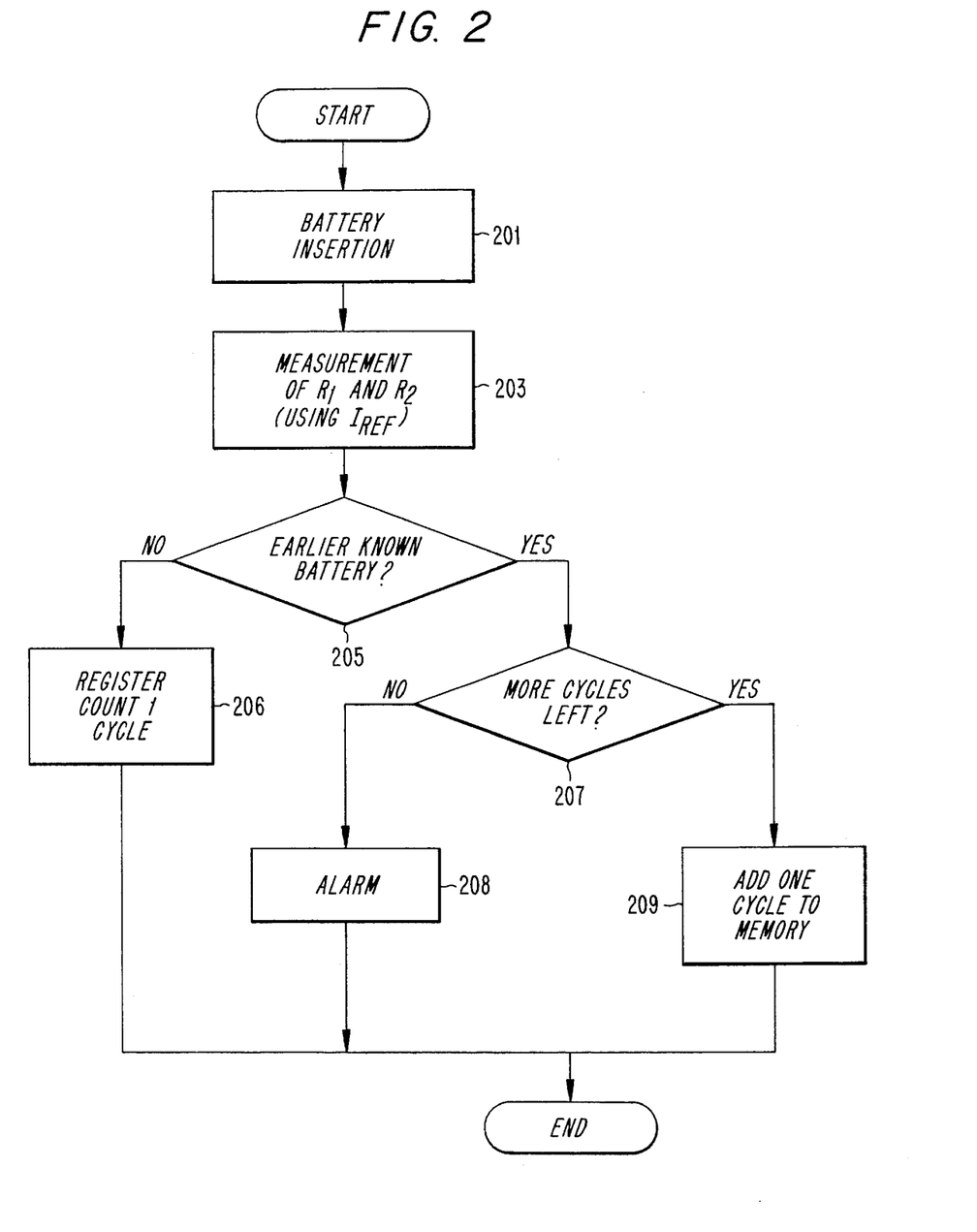
FIG. 2 illustrates a flow chart for implementing an embodiment of the present invention.

FIG. 2 illustrates a flow chart for implementing the present invention which program is executed by the CPU 16. In particular, the battery is inserted into the recharging apparatus or the battery powered equipment (step 201). The resistance values of $R_1$ and $R_2$ are measured using $I_{ref}$ (step 203) which produces a measurable potential difference (voltage drop) across $R_1$ of the series connected resistor pair $R_1$, $R_2$, and resistance $R_{ref}$ which acts as a voltage divider circuit.

At step 205, it is determined whether the individual identified by the resistors $R_1$ and $R_2$ is an earlier identified or known battery. If not, at step 206 the battery is registered and its identity is stored in the memory unit 18 and the memory 18 is incremented by one to count the number of charging cycles. Alternatively, the memory 18 can be used to track the total charging time experienced by the particular battery pack. If the individual battery is recognized at step 205, step 207 determines whether any more cycles are available to that individual battery. If so, one is added to the cycle count in the memory unit 18 associated with that individual battery (step 209). If no more cycles are available, step 208 sends an alarm or takes other action to inform the user that the life time of the individual battery is over.

Referring to FIG. 1, the memory 18 stores the charging status of the identified battery pack, either by keeping track of the number of charging cycles the battery pack has experienced, or the total charging time. Means are provided to signal the charging status to the memory. As noted above, the charging status can be monitored by counting the number of charging cycles experienced by the battery pack or by tracking the total charging time experienced by the battery pack. The signalling means 22 can be provided either in the supervising circuit of the battery pack, as shown in FIG. 1, or in the battery charging circuit (not shown). If the signalling means is provided in the battery charging circuit, the signal may be transmitted either by a partially separate bus or on the ordinary discharging wires. The signalling means 22 signals a change in the charging status every time the battery pack is connected to the battery charging circuit. Alternatively, the signalling means 22 signals a change in the charging status as a function of the total charge which is given to the battery pack at every charge period. In particular, the total charging time times the current input into the battery is monitored each time the battery pack is charged up, and that total is sent to the memory 18, to be summed with the previous stored charging time. When the total charging time reaches a predetermined maximum, further recharging is prohibited or the user is warned as described herein.

According to preferred embodiments, there are a number of alternatives to be taken at step 208 to indicate to the user that the useful life time of the battery is limited to a few remaining cycles or that the useful life of the battery pack is over. That is, when the battery has been discharged the predetermined number of cycles allowable for that battery pack or the total charging time for the battery pack is approaching or has been exceeded, one of a number of things may happen. One alternative is that a message is provided to the user in a display (not shown) that the lifetime of the battery is nearing an end and it should be disposed of due to safety reasons. This message may be given by light signal, on a display, by sound (buzzer or voice) or any other method that is normally used for messages. Another alternative is to refuse to accept the particular battery individual anymore and provide the user with the message to that effect as in the first alternative. A third alternative is that a circuit element in the battery pack may be destroyed so that the individual battery will be useless for future use. If desired, a message can be provided to the user to this effect.

According to the third alternative, a transistor may be employed to create a short circuit between the "+" and "−" terminals of the battery which blows a fuse inside the battery pack. This embodiment is described in more detail below.

Figure 3A:
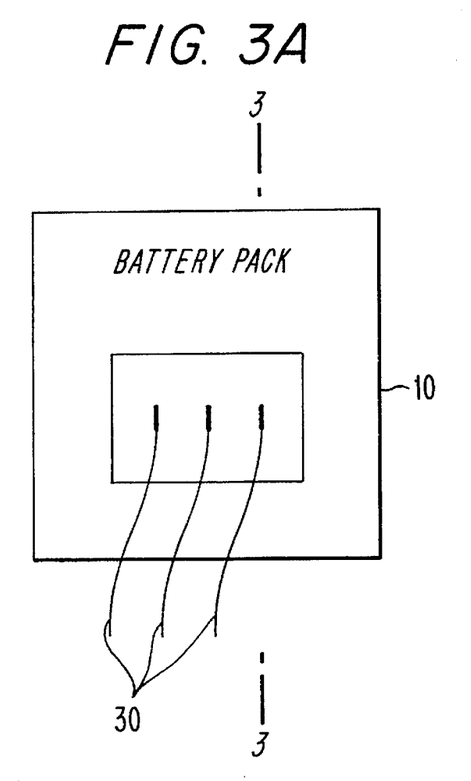
FIG. 3A illustrates an implementation of another embodiment of the present invention.
Figure 3B:
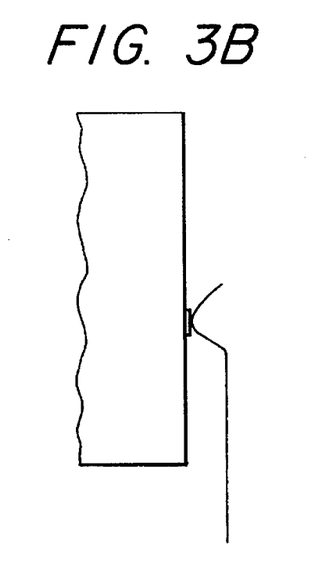
FIG. 3B is a cross section along the line 3—3 of FIG. 3A.

Another embodiment of the invention is shown in FIGS. 3A and 3B. In particular, rather than using resistors from the first embodiment, a resistive ink may be printed in an individual pattern on the surface of the battery. Contact springs 30 may be provided on the outside of the battery pack 10 which touch the surface of the battery pack at specified points. A resistance between the springs will be used to identify and control the recharging of individual batteries according to the software program shown in FIG. 2. According to another embodiment, a bar code or resistive bar code may be used to identify battery pack individuals.

Another embodiment of the present invention, not shown in the drawings, is to have individual signatures, for example, a set of magnets, disposed close to the surface of the battery pack. The reading of the magnetic signature can be implemented using any magneto-sensitive arrangement such as, for example, Hall elements or an array of such elements which feeds the supervising circuit with the information required.

According to another embodiment of the present invention, "smart cards", that is, the family of small, more or less intelligent cards with a semiconductor chip, in a contact pattern, for example, the "SIM" card used in Ericsson cellular telephones, can be used to identify individual battery packs. In this embodiment, at least two connectors, of which one can be the power connector, will be connected to a chip inside the battery pack. The chip will in the most simple version, be only a memory, preferably a non-volatile serial ROM or a RAM with a serial number inside.

Figure 4:
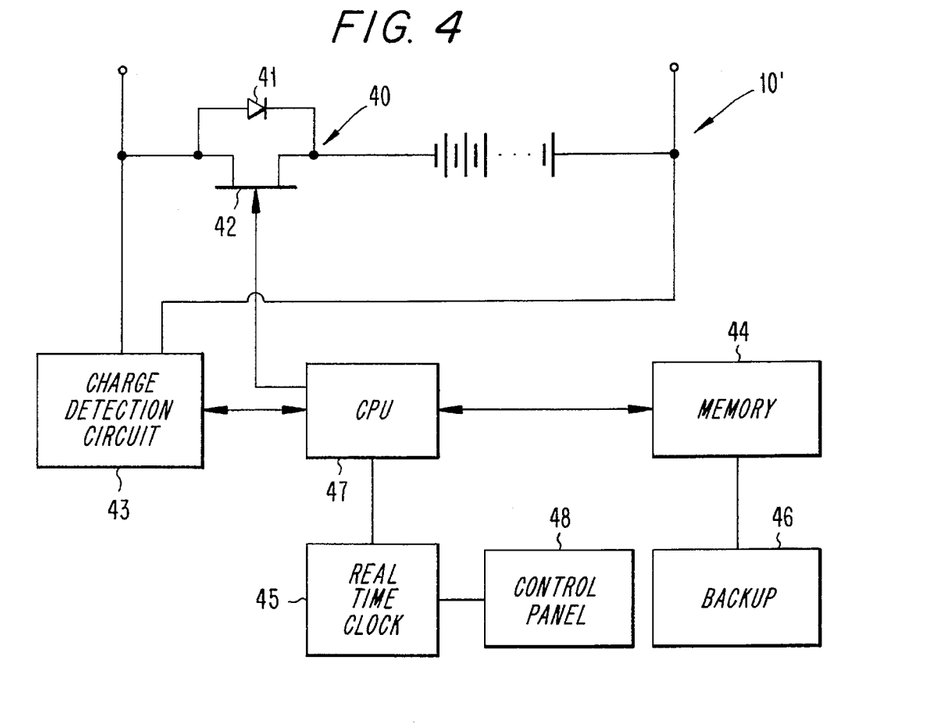
FIG. 4 is another embodiment of the present invention.

Another embodiment of the present invention is shown in FIG. 4 in which the battery pack 10' contains a circuit that will prohibit further charging of the battery pack when a predetermined number of charging cycles is approaching or has been reached or a predetermined total charging time is approaching or has been reached, or any other situation occurs such that no further charging is recommended due to safety or other reasons. As shown in FIG. 4, such circuit consists of a charge detection circuit 43 for detecting the charging of the battery pack 10', a central processing unit (CPU) 47, a memory 44, and a back up battery or capacitor 46. The charge detection circuit 43 may be implemented as a Schmitt trigger or an analog to digital converter. The memory 44 can be either a volatile or a non-volatile memory. The back up battery/capacitor 46 may be omitted if the memory 44 is non-volatile memory. A switch 40 is connected between the charge detection circuit 43 and the battery 10'. The switch 40, for example, may be provided as an FET transistor 42 and a diode 41. The diode 41 can be omitted in an alternative embodiment. When the CPU 47 determines that the individual battery has reached its charging capacity, it sends a signal to close the switch 40, which short circuits the battery thus prohibiting further recharging.

It is understood that the above implementations may be made by logging the discharge conditions instead of the charging conditions of the battery. It is within the skill of an ordinary artisan to implement the present invention using a discharge control method and apparatus once in possession of the instant disclosure.

According to the present invention, if it becomes necessary to keep track of the individual batteries, for example, if a manufacturing problem requires that all battery packs from a particular plant must be checked, the circuitry will be able to point out these battery packs. For example, the identification number provided by the resistors could be displayed to the user on the application display, or on a separate battery pack display.

Further, according to another embodiment, battery packs which have been stressed by heat may need to be replaced after a lower number of recharging cycles than battery packs that have been used under more suitable conditions. A temperature sensor may be provided in the battery pack to detect whether such a stress has been experienced and can so indicate to the CPU. The CPU can then consider this stress to control the number of available recharging cycles permissible for the particular individual battery.

Figure 5:
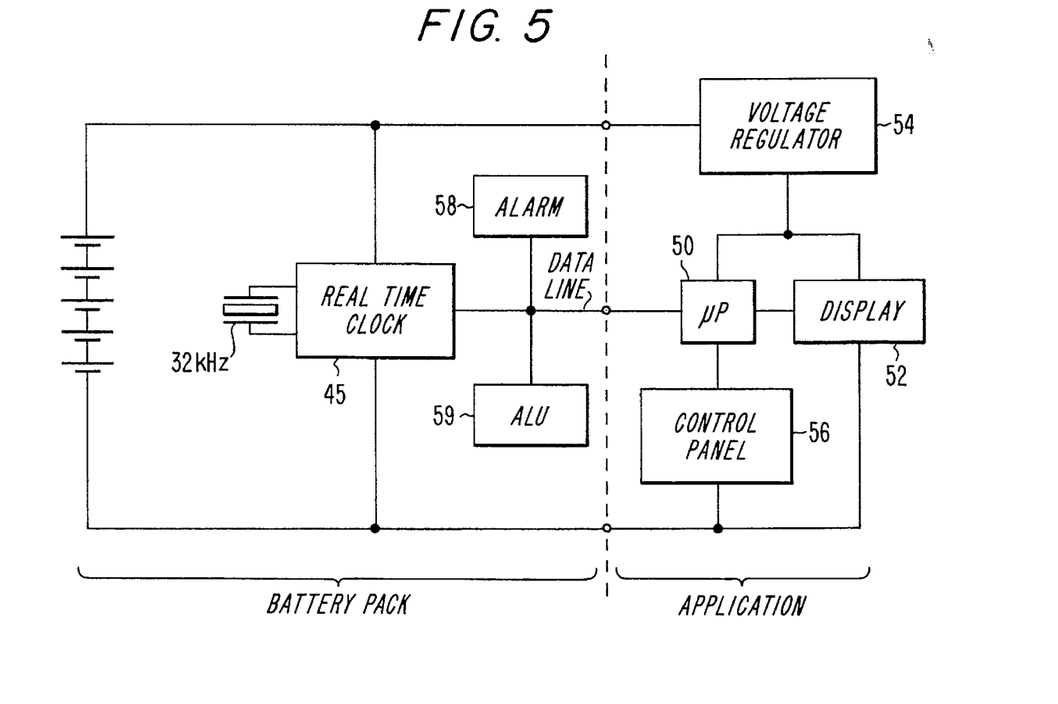
FIG. 5 is an illustration of another embodiment of the present invention.

Another embodiment of the present invention as shown in FIG. 5 in which a real time clock is provided within the battery pack. The circuitry can be used to communicate the real time data to the application, that is, for example, a cellular telephone. This can be accomplished by having an extra pin on the battery pack and the application. If the battery pack is of a rechargeable type, it is possible that the battery may become totally discharged. This may cause the real time circuit to lose the real time information. In such a case, it will be possible to enter date and time information from the application.

The cellular telephone or other applications includes a microprocessor 50 and a display 52 as well as a voltage regulator 54 providing a constant voltage source to the circuit elements. A crystal element provides a 32 kHz signal to the real time clock. The battery pack shown in FIG. 5 includes a real time clock 45, an alarm 58, a 32 kHz crystal, and an arithmetic and logic unit (ALU) 59. A microprocessor may be used instead of the ALU 59.

The display 52 displays the time and data obtained from the real time clock 45 from the data line connected to the microprocessor 50 in the application circuit. The data line is connected to a first pin provided in the battery pack which is connected to a second pin provided in the application circuit (represented in FIG. 5 by a °). The built-in-alarm 58 provided in the battery pack, for example, a vibrator or a buzzer, may be activated at a predetermined time based on the real time clock information. The predetermined time may be set by a control panel 48 on the battery pack (FIG. 4) or the control panel 56 normally used in the battery charger or in the application (FIG. 5).

The real time clock can also be used to activate or shut down the battery powered application in a predetermined manner. The predetermination of the shut down time can be done by a control panel on the battery pack or the control panel normally used with the application equipment. The microprocessor 50 in the application places the application circuit in a non-operational mode, that is, it shuts off the application, when the real time clock reaches the predetermined time.

According to one embodiment, the real time clock may be used to control the recharging of the battery pack. In particular, the real time clock may provide the basis for counting the total charging time experienced by the battery pack as described above.

An advantage achieved by the present invention occurs by adding the clock to the battery pack itself since the clock will always have the power to keep the time correctly during charging and the back up battery or capacitor can be eliminated. By including one or more extra connections between the battery pack and the telephone or the application equipment, it is possible for the microprocessor in the application equipment to communicate with the clock circuit to inquire as to the current time, set an alarm and set the time. The connections would also enable the microprocessor to be woken up by the clock circuit in the event of an alarm.

Figure 6:
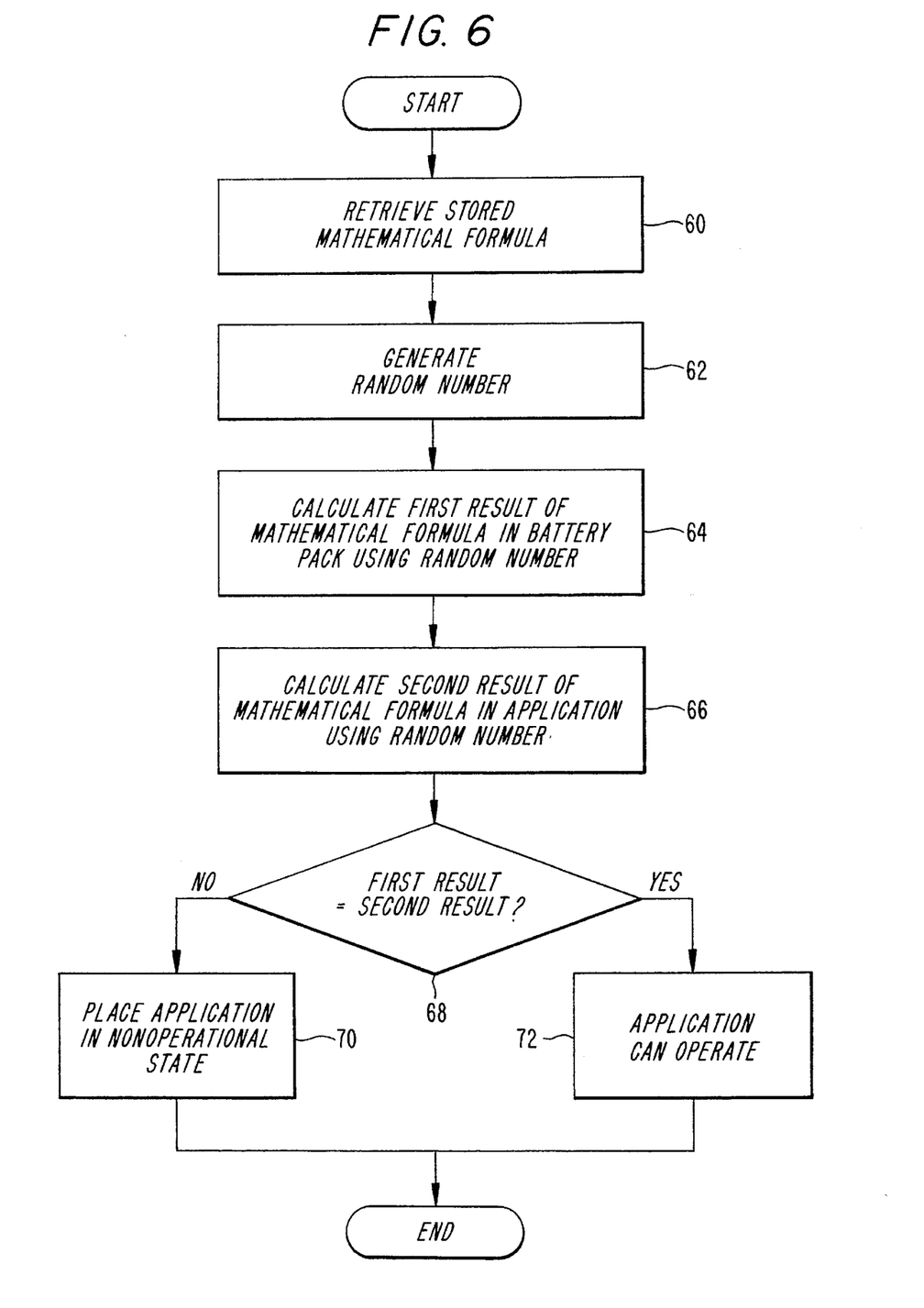
FIG. 6 is a flow chart for implementing a preferred embodiment of the present invention.

Another embodiment of the present invention is shown in the flow chart of FIG. 6. According to this embodiment, the memory and the CPU of the battery pack, such as that shown in FIG. 4, is used in conjunction with the memory and CPU in the application circuit (not shown) to make it possible for the battery powered application or the battery charger to distinguish a correct battery from a battery that is manufactured by somebody else. To prevent unauthorized manufacturers from copying this electronic circuit, the memory unit 44 contains mathematical formula that is also known to the application circuit and stored in the memory thereof (not shown).

When the application is powered up, it retrieves the stored mathematical formula from the application memory (step 60). At the same time, the battery pack 10' retrieves the stored mathematical formula from the battery memory unit 44. A random number is generated by the application equipment (step 62). This random number is used as the input to the mathematical formula stored in the battery pack as well as that stored in the application. The first result of the mathematical formula is calculated in the battery pack using the random number generated in step 62 (step 64). The second result of the mathematical formula is calculated in the application using the random number generated in step 62 (step 66). The result of both calculations are communicated to the application where they are compared at step 68. If the first result is not equal to the second result, this indicates that the battery pack is a counterfeit battery pack and the application is placed in an non-operational state (step 70). If the application is placed in the non-operational state, the reason therefor may be communicated to the user by a display or alarm. If the first result equals the second result, the application is permitted to operate at step 72. If the application is placed in the non-operational state, this reason therefore may be communicated to the user by a display or alarm.

According to another embodiment, a modular-two addition to a number hidden in the battery pack may serve to determine whether the battery pack is counterfeit. According to a preferred embodiment, the charger or application sends a number in serial form to the battery pack. The CPU in the battery pack adds a number with module-two addition and returns the results to the supervising unit, the battery charger or the application. After the new modular-two addition, the supervising unit checks whether or not the hidden number from the battery pack is a member of the accepted group of numbers.

The foregoing description of the specific embodiments will so fully reveal the general nature of the invention that others can, by applying current knowledge, readily modify and/or adapt for various applications such specific embodiments without departing from the genetic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. An apparatus for identifying an individual battery pack, comprising:

at least one resistor having a particular resistance value;

a supervising unit for reading the particular resistance value of said at least one resistor to determine the individual identity of the battery pack;

means for controlling a recharging operation of said battery pack responsive to said supervising unit, said means for controlling comprising means for determining remaining useful life of said battery pack depending on a number of charging cycles performed on said battery pack identified by said supervising unit and a level of discharging of said battery pack at each discharging cycle;

circuit means connected to said battery pack for allowing recharging of said battery pack; and means for short-circuiting said circuit means to prevent said battery pack from being recharged responsive to said means for determining.

2. The apparatus according to claim 1, further comprising means for informing a user that the useful life of said battery pack is approaching an end or is over responsive to said means for determining.

3. The apparatus according to claim 2, wherein said means for informing comprises one of a light signal, a display, or an audio signal.

4. The apparatus according to claim 1, further comprising means for preventing further recharging cycles of the identified battery pack, if the useful life of said battery pack is approaching an end or has ended, responsive to said means for determining.

5. The apparatus according to claim 1, further comprising means for indicating to a user that the useful life of said battery pack is approaching an end or has ended responsive to said circuit means being short-circuited.

6. An apparatus for controlling recharging of an individual battery pack comprising:

means for identifying an individual battery pack;

supervising means for selectively allowing and preventing recharging of said individual battery pack responsive to said means for identifying, said supervising means comprising means for determining remaining useful life of said battery pack depending on a number of charging cycles performed on said battery pack identified by said means for identifying and a level of discharging of said battery pack at each discharging cycle;

circuit means connected to said battery pack for allowing recharging of said battery pack; and means for short-circuiting said circuit means to prevent said battery pack from being recharged responsive to said means for determining.

7. The apparatus according to claim 6, wherein said means for identifying comprises:

at least one resistor having a particular resistance value; and wherein said supervising means reads the particular resistance value of said at least one resistor to determine the identity of the battery pack and selectively allows or prevents recharging depending on said identity and remaining useful life of said identified battery pack.

8. The apparatus according to claim 6, wherein said means for identifying comprises:

an individual pattern printed on a surface of said battery pack; and wherein said supervising means reads the particular pattern printed on said battery pack to determine the identity of the battery pack and selectively allows or prevents recharging depending on said identity and remaining useful life of said identified battery pack.

9. The apparatus according to claim 8, wherein said pattern is printed using resistive ink.

10. The apparatus according to claim 6, further comprising means, responsive to said means for determining, for informing a user that the useful life of said battery pack is approaching an end or is over.

11. The apparatus according to claim 10, wherein said means for informing comprises one of a light signal, a display, or an audio signal.

12. The apparatus according to claim 6, wherein said means for short-circuitry prevents further recharging cycles of the identified battery if the useful life of said battery pack is approaching an end or is over.

13. The apparatus according to claim 6, further comprising means for indicating to a user that the useful life of said battery pack is approaching an end or has ended, responsive to said circuit means being short-circuited.

14. The apparatus according to claim 6, wherein said supervising means comprises:

memory means for storing charging status of said battery pack;

means for signalling said charging status to said memory means.

15. The apparatus according to claim 14, wherein said means for signalling is provided in said battery pack.

16. The apparatus according to claim 14, wherein said means for signalling is provided in a charging circuit.

17. The apparatus according to claim 14, wherein said means for signalling signals a change in said charging status every time said battery pack is connected to a charging circuit.

18. The apparatus according to claim 14, wherein said means for signalling signals a change in said charging status as a function of total charge which is given to said battery pack at every charge period.

19. The apparatus according to claim 18, wherein said function is current times time.

20. The apparatus according to claim 14, wherein said memory means comprises a non-volatile memory.

21. The apparatus according to claim 14, wherein said memory means comprises a volatile memory requiring a small amount of current such that said battery pack can supply power to said memory means regardless of the charging condition of said battery pack.

22. The apparatus according to claim 14, wherein said memory means comprises a volatile memory connected to an external power source.

23. The apparatus according to claim 18, wherein said memory means comprises a volatile memory connected to an external power source.

24. The apparatus according to claim 14, wherein said means for signalling signals a change in said charging status every time said battery pack is connected to a discharging circuit.

25. The apparatus according to claim 6, further comprising:

a real-time clock provided in said battery pack; and means for providing real-time clock information from said real-time clock to an application circuit to which said battery pack is connected.

26. The apparatus according to claim 25, wherein said means for providing comprises:

first pin means provided on said battery pack; and second pin means provided on said application circuit adapted to be connected to said first pin means.

27. The apparatus according to claim 25, further comprising means for entering time and date information to said real-time clock.

28. The apparatus according to claim 25, further comprising means provided in said application circuit for shutting off said application circuit responsive to said real-time clock.

29. The apparatus according to claim 25, wherein said supervising means comprises means for controlling recharging of said battery pack using said real-time clock.

30. The apparatus according to claim 25, further comprising a display provided on said battery pack for displaying time and date information.

31. The apparatus according to claim 25, further comprising alarm circuit means provided in said battery pack for setting off an alarm at a predetermined time.

32. The apparatus according to claim 25, further comprising a control panel for entering said predetermined time into said alarm circuit means.

33. The apparatus according to claim 32, wherein said control panel is provided in said battery pack.

34. The apparatus according to claim 32, wherein said control panel is provided in said application circuit.

35. The apparatus according to claim 31, wherein said alarm circuit means is selected from one of an audio alarm, a vibrating alarm, and a visual alarm.

36. The apparatus according to claim 6, further comprising:

means for verifying the authenticity of a battery pack which has been connected to an application circuit; and means for placing said application circuit in an non-operational state responsive to said means for verifying.

37. The apparatus according to claim 36, wherein said means for verifying comprises:

means for storing a predetermined mathematical formula provided in said battery pack and in said application circuit;

means for generating a random number;

means for calculating a first result of said mathematical formula in said battery pack using said random number;

means for calculating a second result of said mathematical formula in said application circuit using said random number;

means for comparing said first result to said second result and outputting a verification signal; and wherein said means for placing places said application circuit in the non-operational state when said verification signal indicates that said first result does not equal said second result.

38. The apparatus according to claim 37, further comprising means for indicating that said battery pack is not authentic when said verification signal indicates that said first result does not equal said second result.

39. The apparatus according to claim 38, wherein said application circuit is a recharging circuit.

40. An apparatus for controlling an operational state of an application circuit, said apparatus comprising:

means for verifying the authenticity of a battery pack which has been connected to an application circuit, said means for verifying comprising:

means for storing a predetermined mathematical formula provided in said battery pack and in said application circuit;

means for generating a random number;

means for calculating a first result of said mathematical formula in said battery pack using said random number;

means for calculating a second result of said mathematical formula in said application circuit using said random number; and means for comparing said first result to said second result and outputting a verification signal;

said apparatus further comprising means for placing said application circuit in an non-operational state responsive to said means for verifying when said verification signal indicates that said first result does not equal said second result.

41. The apparatus according to claim 40, further comprising means for indicating that said battery pack is not authentic when said verification signal indicates that said first result does not equal said second result.

42. The apparatus according to claim 41, wherein said application circuit is a recharging circuit.

* * * * *